United States Patent [19]
> Hougen

[11] 3,825,362
[45] July 23, 1974

[54] ARBOR FOR AN ANNULAR HOLE CUTTER
[76] Inventor: Everett D. Hougen, G-5072
Corunna Rd., Flushing, Mich.
48504
[22] Filed: Feb. 26, 1973
[21] Appl. No.: 335,826

[52] U.S. Cl.................................. 408/68, 408/204
[51] Int. Cl...................... B23b 47/00, B23b 51/04
[58] Field of Search ............. 408/68, 204, 205, 206, 408/207, 208, 209, 224, 703

[56] References Cited
UNITED STATES PATENTS
2,923,180  2/1960  Dunn et al............................ 408/68
3,180,018  4/1965  Hougen............................ 408/68 X

*Primary Examiner*—Gil Weidenfeld
*Attorney, Agent, or Firm*—Barnes, Kisselle, Raisch & Choate

[57]     ABSTRACT

A cup-shaped annular cutter for forming circular holes in workpieces mounted on the end of an arbor, the arbor being provided with a center pilot member adapted for ejecting the center slug resulting from the opening cut by the cutter. The arbor preferably has a sleeve mounted for axial sliding movement on the shank of the arbor with a transverse pin on the sleeve extending through a slot in the arbor for engaging the inner end of the pilot member.

7 Claims, 15 Drawing Figures ns for the arbor in the form
of centering drills;

ARBOR FOR AN ANNULAR HOLE CUTTER

This invention relates to arbors for annular hole cutters and, more specifically, to arbors of this type embodying means for ejecting the circular slug cut from the workpiece from within the cup-shaped cutter upon completion of the cut.

Annular hole cutters (that is, cutters of the type which cut an annular groove in a workpiece to form a round hole in the workpiece) are normally of cup shape with cutting teeth around the periphery of the free end of the cup side wall. A common problem involved in the use of such cutters is the tendency for the round slug formed by the cutter to become wedged or cocked within the cup-shaped cutter upon penetration of the cutting teeth through the back side or underside of the workpiece. Attempts to solve this problem have included the provision of holes in the bottom or end wall of the cup through which a knock-out tool may be inserted for forcibly ejecting the slug and also the use of spring-biased pilot members for ejecting the slug. However, spring-biased pilot members are not always effective to eject the slug from within the cup, depending upon the extent to which the slug is jammed or wedged within the cup-shaped cutter. On the other hand, the use of knock-out punches inserted through holes in the end wall of the cup is very time consuming. In any event, where the cutter is used for forming holes on a production basis it is essential that the slug be positively ejected from within the cup every time the cutter penetrates through the workpiece.

Accordingly, the primary object of this invention is to provide an arbor embodying means for positively ejecting the round slug formed by the cutter from within the cup portion of the cutter upon completion of the hole cutting operation.

A further object of the invention resides in the provision of an arbor provided with a pilot member designed to positively hold the cutter on a true center and thus prevent the cutter from "skipping" over the surface of the workpiece and also designed to positively eject the slug cut from the work from within the cup-shaped cutter. This feature of the invention is especially important where the arbor is mounted on a hand-held power tool.

Another object of the invention resides in the provision of an arbor of the type described wherein the centering pilot member on the arbor is in the form of an axially retractable drill designed to cut a centering hole of only sufficient depth to properly center the cutter on the workpiece, means being provided in the arbor to restrict retraction of the drill only until the shallow pilot hole is drilled and, thereafter, permit the pilot drill to retract easily after the cutter has initiated its hole cutting groove so as to minimize the axial force required to feed the cutter through the workpiece.

Still another object of the present invention is to provide an arbor of the type described which ejects the cut slug from within the cutter but at the same time is adapted to retain the slug on a pilot member on the arbor so that the slug will not drop off freely and can, therefore, be extracted from the hole cut. This is important where the hole is being cut in a conduit, a vehicle frame or body member, etc. and it is either desirable or necessary to prevent the slug from dropping into the closed section of the member in which the hole is being cut.

Other objects and features of the present invention will become apparent from the accompanying disclosure and drawings, in which.

Figure 1:
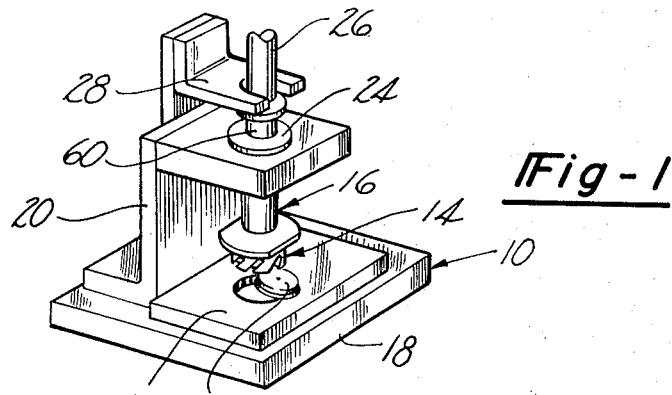
FIG. 1 is a fragmentary perspective view of a hole cutting apparatus embodying a cutter provided with an arbor of the present invention.

Referring to FIG. 1, there is illustrated a hole cutting fixture (generally designated 10) which may be employed for cutting holes in a workpiece 12 with an annular cutter 14 utilizing the arbor 16 of the present invention. The fixture includes a base 18 on which workpiece 12 is supported and having an upstanding bracket 20 which supports a horizontally extending plate 22 which is bored to receive a guide bushing 24. Arbor 16 is adapted to be rotated by means of any suitable rotary driven member 26. A yoke 28 is fixedly supported on base 18 so as to extend horizontally above bushing 24 with the U-shaped opening 30 therein extending around the arbor. While the arrangement shown in FIG. 1 illustrates the arbor with its axis extending vertically, it will be appreciated that, depending upon the nature of the work and the machine tool employed for forming the holes, the arbor axis can extend either vertically or horizontally.

Figure 2:
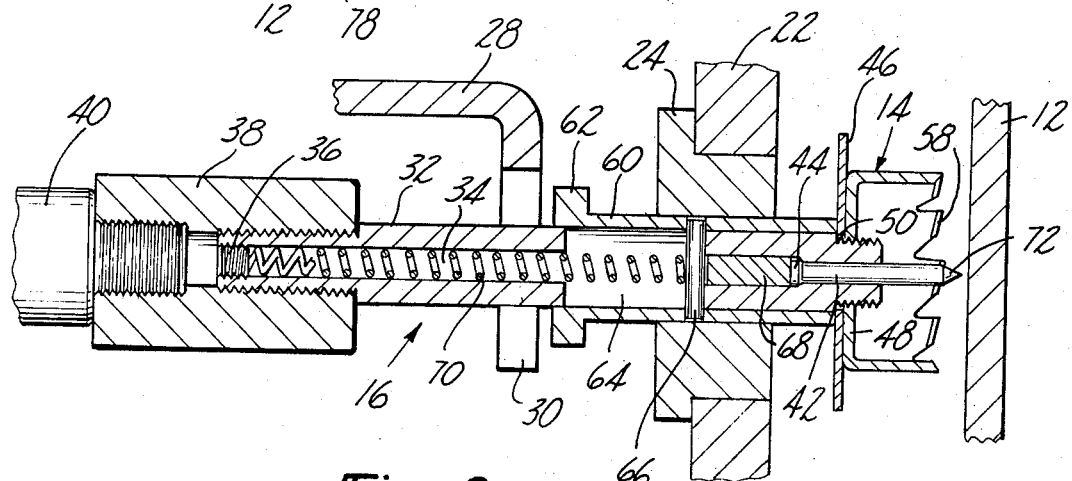
FIG. 2 is a fragmentary sectional view illustrating the construction of the arbor and the operation thereof at the initiation of a cutting operation.

Referring more specifically to FIG. 2, arbor 16 includes a cylindrical shank 32 having a central bore 34. At one end bore 34 is threaded to receive a set screw 36 adjustable axially of the bore. The corresponding end of shank 32 is externally threaded for connection with an adaptor 38 threaded or otherwise secured to the rotary driven member shown as a machine spindle 40 of a suitable tool, such as a drill press. The opposite end of bore 34 is of reduced diameter to slideably receive a pointed pilot pin 42. The inner end of pilot pin 42 is enlarged slightly as at 44 to limit the extent to which the pilot pin can project outwardly beyond the cup-shaped annular cutter 14. Cutter 14 is threaded or otherwise secured to the leading end of shank 32. In the case of a threaded connection a large washer 46 is disposed between the end or bottom wall 48 of cutter 14 and a shoulder 50 adjacent the threaded portion of shank 32. Washer 46 (see FIG. 5) has an outer diameter greater than the outer diameter of cutter 14 and is flattened on diametrically opposite sides thereof as at 52. Washer 46 is resilient and initially is slightly dished so that when the cutter is tightened on the end of shank 32 the washer is flattened in tight frictional engagement with bottom wall 48 of cutter 14. This enables the cutter 14 to be released from shank 32 by gripping washer 46 at flattened sides 52 thereof and turning washer 46 in a direction tending to remove the cutter from the threaded end of shank 32. Washer 46 also serves as a top engageable with the top face of the stock in which the hole is formed to prevent the cutter from dropping through the hole formed. The side wall 56 of cutter 14 is formed with suitable cutting teeth 58 around the free edge thereof. In the embodiments illustrated the cutting edges of teeth 58 slope radially in a direction inwardly and toward end wall 48 of the cutter.

Shank 32 has a smooth outer cylindrical surface on which a relatively thin walled sleeve 60 is slideably arranged. At one end sleeve 60 is fashioned with a radially outwardly extending enlarged flange 62, the diameter of which is greater than the width of the U-shaped opening 30 in yoke 28. Shank 32 is axially slotted as at 64 and pin 66 extending diametrically through sleeve 60 extends through slot 64. Pin 66 is located centrally between the ends of sleeve 60 and sleeve 60 has an axial extent sufficient to completely overlie and close slot 64 at the diametrically opposite edges thereof so as to prevent the ingress of dirt, chips, etc. into the slot. In the condition of the arbor illustrated in FIG. 2 sleeve 60 is disposed axially of shank 32 so that pin 66 abuts the forward end of slot 64. A plunger 68 in bore 34 extends between pin 66 and the enlarged end 44 of pilot pin 42. Preferably plunger 68 is dimensioned in length to provide a small gap between the plunger and pin 66 when pin 66 is at the forward end of slot 64 to prevent a hammering effect on the pilot which may be damaging to the pilot seat on the shank or the hereinafter described locking screw employed for rotating the pilot with the shank. Sleeve 60 is normally biased to the position shown in FIG. 1 by means of a compression spring 70 in bore 34 having one end bearing against pin 66 and the opposite end bearing against the inner end of adjustable set screw 36. Screw 36 is adapted to be threaded into or out of bore 34 to vary the tension of spring 70 and thus vary the force required to retract pilot pin 42. In the position shown in FIG. 2 (that is, when a cutting operation is about to begin) the pointed end 72 of pilot pin 42 projects axially beyond the cutting edges of teeth 58.

Figure 3:
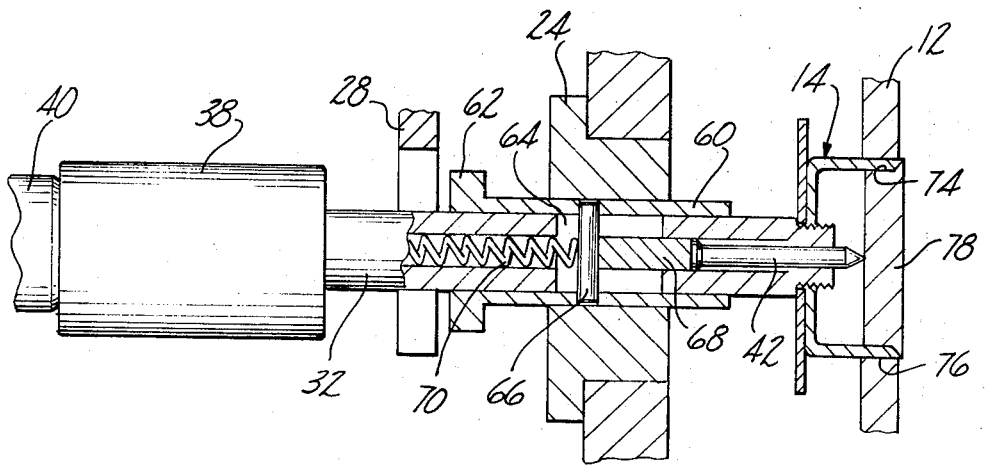
FIG. 3 is a view similar to FIG. 2 and showing the position of the various components at the end of the cutting operation.

Referring now to FIG. 3, when it is desired to cut a hole in workpiece 12 the rotating spindle 40 is advanced axially so that shank 32 of arbor 16 is rotated and advanced axially toward the work. Initially the pointed end 72 of pilot pin 42 engages workpiece 12 since it projects axially beyond cutting teeth 58. In the arrangement illustrated in FIGS. 1 through 4 pilot pin 42 is not required for maintaining cutter 14 concentric with the hole to be formed in the workpiece. The centering function is provided by guide bushing 24 in which sleeve 60 has a close sliding fit. When the arbor is used with a guide bushing pilot pin 42 may be formed with a blunt end rather than a sharp pointed end. Sleeve 60 also has a close sliding fit with the cylindrical shank 32 of the arbor. As the arbor advances axially toward the workpiece pilot pin 42 progressively retracts as cutter 14 advances into the workpiece. As pilot pin 42 retracts into bore 34 of the arbor, plunger 68 provides an axial driving connection between pilot pin 42 and pin 66. Thus, while shank 32 advances axially toward the work, pin 66 on sleeve 60 simultaneously shifts rearwardly in slot 64. Obviously the axial extent of slot 64 has to be greater than the thickness of the workpiece in which the opening is to be formed. It will be noted that as cutter 14 advances through the workpiece it cuts a circular groove 74 therein, the outer periphery of groove 74 defining opening 76 in workpiece 12 and the inner periphery of groove 74 defining the outer periphery of a circular slug 78 cut from the workpiece by the cutter.

Figure 4:
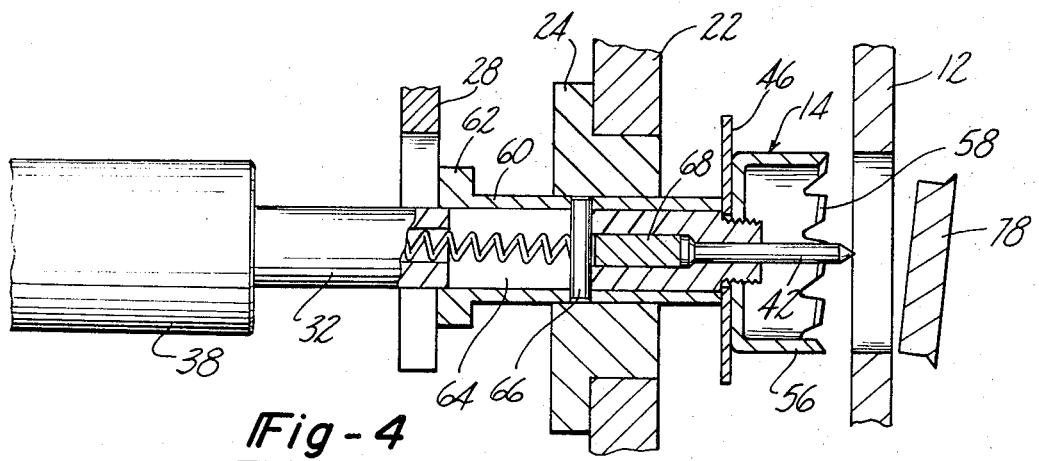
FIG. 4 is a view similar to FIG. 2 and showing the manner in which retraction of the arbor positively ejects the slug from within the cup-shaped cutter.

In FIG. 3 the arbor is shown advanced to a position wherein the cutter has penetrated through the back side or under side of the workpiece. Thus, opening 76 is completely formed in the workpiece. Under some circumstances the circular slug 78 may be cocked or wedged (by reason of dirt, chips, etc.) within cup-shaped cutter 14. The tension of spring 70 may be insufficient to dislodge slug 78 from within the annular cutter. With the arbor of this invention the slug is adapted to be positively ejected from within the cutter in the manner shown in FIG. 4. After the cutter has penetrated through the work the arbor is retracted with the wedged slug 78 retained within the cup-shaped cutter 14. However, as the arbor is retracted away from the work flange 62 on sleeve 60 engages yoke 28 and thus arrests retraction movement of sleeve 60. Accordingly, as shank 32 is further retracted pin 66 forms a positive stop for plunger 68 and pilot pin 42 to prevent these members from retracting with shank 32. Thus, as cutter 14 retracts with shank 32 and relative to the stationary pilot pin 42, slug 78 is forcibly ejected from within the cutter as shown in FIG. 4.

Figure 5:
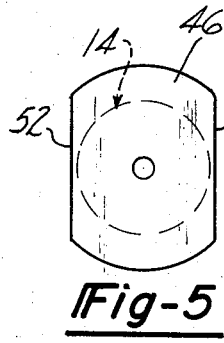
FIG. 5 is a plan view of the washer used on the arbor adjacent the cutter.

FIG. 5 illustrates the fact that washer 46 has its flats 52 spaced radially outwardly beyond the side wall of cutter 14. Thus, in addition to serving as a stop for the arbor, washer 46 can be utilized for removing the cutter from the threaded end of shank 32. This is accomplished by engaging flats 52 of washer 46 and rotating it in a direction causing cutter 14 to become loosened on the threaded end of shank 32. It will be appreciated, of course, that instead of forming flats 52 on washer 46 the washer may be provided with a pair of diametrically opposite openings therethrough for engagement with a spanner wrench.

Figure 6:
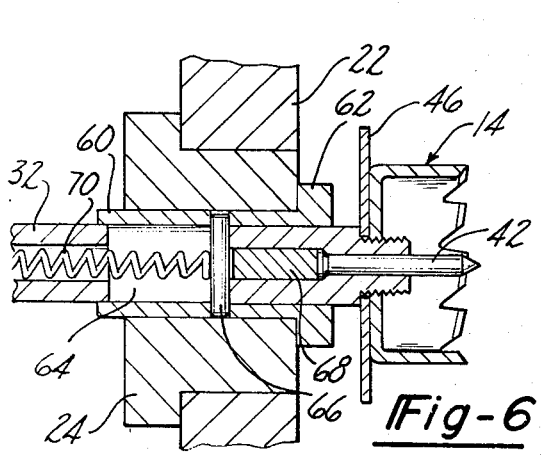
FIG. 6 is a fragmentary view similar to FIG. 1 and showing the sleeve reversely positioned on the arbor.

Depending upon the nature of the machine tool on which the arbor is used and the workpiece in which the holes are being formed, in some instances it may not be practical or feasible to insert the arbor downwardly or forwardly through bushing 24. It is for this reason that pin 66 is located approximately axially central of sleeve 60. Under these circumstances sleeve 60 can be arranged on shank 32 in the manner shown in FIG. 6 wherein flange 62 is positioned adjacent cutter 14 as compared with the arrangement shown in FIGS. 1 through 4 wherein flange 62 is located on the arbor remotely from cutter 14. Thus, with the arrangement shown in FIG. 6 the arbor can be inserted upwardly or rearwardly through bushing 24 to engage it with the machine tool spindle. With this arrangement the arbor operates in substantially the same manner as previously described with the exception, however, that should slug 78 become wedged in the cutter it will be forcibly ejected therefrom when the arbor is retracted sufficiently to interengage flange 62 with the under side of bushing 24.

Figure 7:
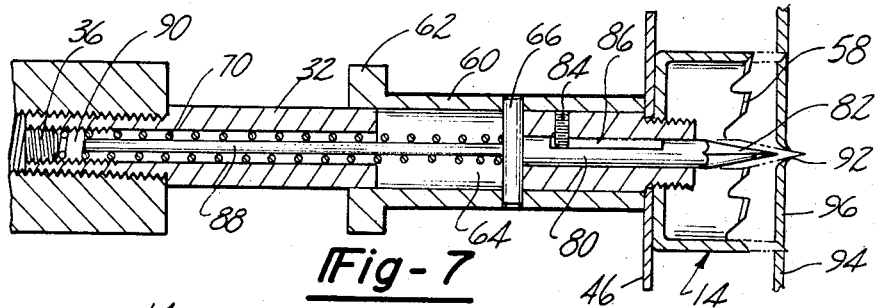
FIG. 7 is a fragmentary sectional view of a modified form of arbor in accordance with the present invention.

The arbor illustrated in FIG. 7 differs only slightly from that illustrated in FIGS. 1 through 4. In FIG. 7 the pilot member 80 is of the same diameter as bore 34 and is of sufficient length as to eliminate the need for a plunger such as shown at 68 in FIGS. 1 through 4. Pilot 80 has a pointed end 82 which is designed to pierce a hole through thin sheet metal when the arbor is rotated and advanced axially into the workpiece. Pilot 80 is positively driven with shank 32 by means of a locking screw 84 engaging an axially extending slot 86 in pilot member 80. At the same time within bore 34 there is arranged a stop rod 88 which extends axially through spring 70. The length of pilot member 80 is such that under the bias of spring 70 the pointed end 82 projects considerably axially beyond the teeth 58 of cutter 14. However, when screw 84 is engaging the rear end of slot 86 there is a slight clearance between pin 66 and the rear end of pilot 80 to avoid the hammering effect previously referred to. This enables the cutter to be accurately located at the desired center and to retain its center position as the cutter is advanced toward the work by the tension of spring 70 acting on pilot 80. Stop rod 88 is dimensioned in length and adjusting screw 36 is located relative thereto so that initially there is provided an axial gap 90 between screw 36 and the end of stop rod 88. Thus, as the arbor is advanced toward the work, the end 82 of spring pressed pilot 80 locates the cutter at the intended center of the hole to be cut while spring 70 compresses. However, after spring 70 compresses a predetermined amount adjusting screw 36 abuts the end of stop rod 88 and thus prevents further retraction of pilot 80 relative to shank 32. The axial gap 90 is preferably determined in length such that when pilot 80 is fully retracted the pointed end 82 still projects slightly beyond the teeth 58 of the cutter. Accordingly, as the arbor is advanced into the work the piercing point 82 of pilot 80 extrudes an opening 92 in the sheet metal to retain the cutter at the desired centered location while the teeth 58 cut at an annular groove through the sheet metal. In FIG. 7 the sheet metal workpiece is designated 94 and the circular slug cut therefrom is designated 96. The piercing end 82 of pilot 80 preferably has the construction and configuration of the piercing tool disclosed in my U.S. Pat. No. 3,559,445. After teeth 58 have penetrated through the sheet metal the opening therein is completely formed and the slug 96, being engaged with the tapered portion of end 82, is forcibly ejected from within the cup by compression spring 70. Since pilot 80 penetrates through the workpiece, slug 96 is always cut completely free of the sheet metal panel so that there is no tendency for the slug 96 to hinge around an edge portion of the opening being formed, even though the plane of teeth 58 may not be exactly parallel to the plane of the sheet metal. Moreover, since the tapered pilot is rotating the cut slug normally simply falls off the pilot or slides off when the arbor is retracted.

It will be appreciated that it is not essential to employ a yoke such as shown at 28 for positively ejecting the slug from within the cutter should the slug become wedged therein. As long as sleeve 60 has an enlarged flange 62 at one end thereof positive ejection of the slug can always be effected by tapping flange 62 with a suitable tool. The provision of the radially enlarged flange enables the sleeve itself to be of relatively light weight. This is not only economical from the standpoint of cost, but also important to minimize its mass.

Figure 9:
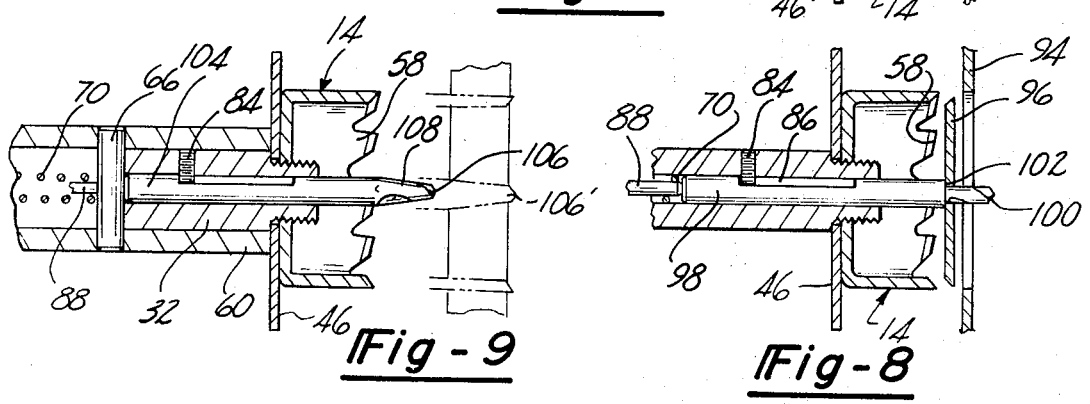
FIGS. 8 and 9 are sectional views illustrating alternate forms of pilot members for the arbor in the form of centering drills.
Figure 8:
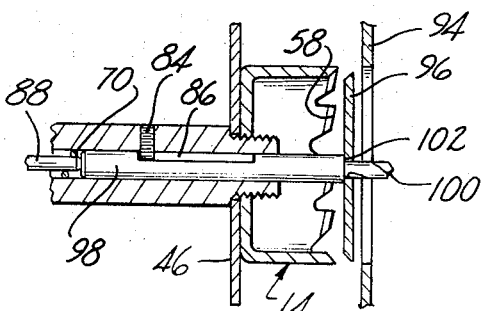
Figure 11:
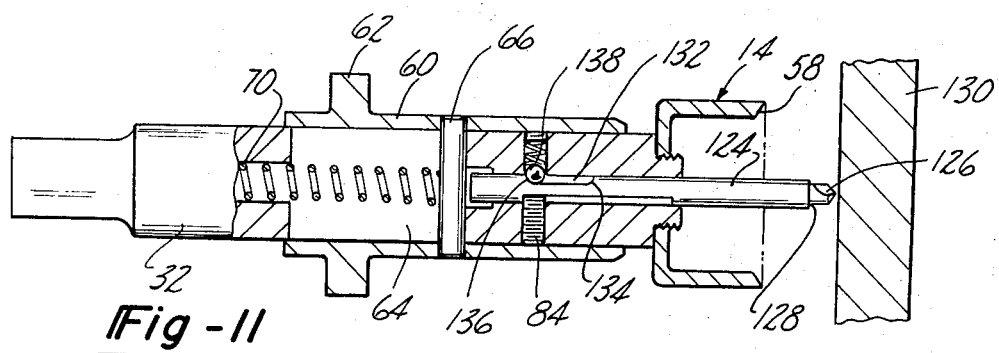
FIGS. 11 through 14 are views illustrating the operation of another modification of arbor according to the present invention.

In FIGS. 8 and 9 the arbor is substantially the same as that shown in FIG. 7 except that the free ends of the pilot members are formed as drills. In FIG. 8 pilot 98 has a small diameter drill point 100 at its leading end which connects with the larger diameter shank of the pilot by a square shoulder 102. Under the tension of spring 70 pilot 98 normally assumes a position wherein shoulder 102 projects axially beyond the outer ends of cutting teeth 58. However, stop rod 88 is designed to form an axially solid driving connection between adjusting screw 36 and pilot 98 after spring 70 has compressed sufficiently so that shoulder 102 is disposed in a plane located inwardly of the cutting teeth 58 a distance only slightly greater than the thickness of the stock being cut. Drill point 100 is of sufficient length to penetrate through the sheet metal workpiece 94 when the opposite ends of stop rod 88 are in abutting relation with pilot 98 and screw 36.

In the case of thin sheet metal where the pilot penetrates completely through the stock it is unlikely that slug 96 will become jammed or wedged within the cutter. The tension of spring 70 will normally be sufficient to eject the slug from within the cup. Accordingly, in FIG. 8 the arbor is illustrated without sleeve 60 so that stop rod 88 abuts directly against the inner end of pilot member 98. Obviously the arbor may incorporate sleeve 60 in the manner illustrated in FIG. 7 if the provision of such a sleeve is desirable.

The arbor illustrated in FIG. 9 is likewise very similar to that illustrated in FIG. 7 and differs therefrom only with respect to the pilot member employed. In the arrangement shown in FIG. 9 pilot 104 has the configuration of a drill at its leading end. However, the extreme free end 106 is formed as a conventional drill point for a very short axial distance and is connected to the larger diameter of the shank of the pilot by a tapered fluted drill portion 108. As shown in FIG. 9, pilot 104 is normally urged axially outwardly by spring 70 to a position wherein the drill point 106, 108 projects axially beyond the plane of the cutting teeth 58. Stop rod 88 is of such length as to limit retraction of pilot 104 axially relative to shank 32 to a position wherein the drill point end 106 projects axially only slightly beyond the cutting edges of teeth 58 as shown in broken lines at 106'. Thus, pilot 104 normally projects outwardly beyond the cutter a distance sufficient to readily locate the cutter at the intended center of the hole being cut. Thereafter, when the arbor is driven axially toward the work, pilot 104 retracts against the bias of spring 70 and starts to drill a center hole just before the cutting teeth 58 engage the workpiece.

In view of the tapered drill section 108 on pilot 104, the pilot drills a tapered hole in the workpiece which assists considerably in retaining a true axial center as the cutter advances through the work. This is important because normally a drill forms a slightly oversized hole in the material being drilled. However, with the pilot formed as shown in FIG. 9 the tapered portion 108 of the drill point not only forms a tapered hole in the workpiece to hold the cutter on center, but also serves as a shoulder for ejecting the slug from within the cutter in the event the slug should become wedged therein.

The provision of the tapered portion 108 eliminates the need for critical relative adjustment of stop rod 88 and screw 36. However, it is obvious that the cone point of a conventional drill could be utilized for the same purpose as the tapered portion 108. When a conventional drill is employed this accurate centering effect can be achieved by adjusting screw 36 so that when the end of the drill is brought into contact with the work and spring 70 is compressed to engage stop rod 88 with screw 36 the teeth of the cutter are spaced from the top face of the workpiece a distance less than the axial extent of the cone point of the drill. When screw 36 is so adjusted the point of the drill will still be cutting a cone-shaped centering socket in the work when the cutter teeth break through the back side of the workpiece.

Figure 10:
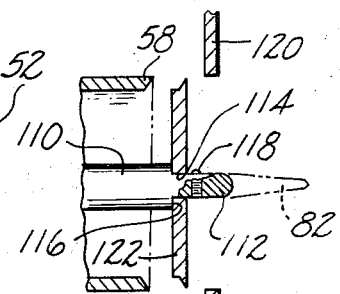
FIG. 10 is a fragmentary sectional view showing alternate pilot constructions for the arbor.

Insofar as the arbor itself is concerned the arrangement shown in FIG. 10 is substantially the same as that shown in FIGS. 1 through 4 with the exception however that the pilot (designated 110) has a reduced cylindrical end portion 12 adapted to be inserted through a predrilled hole 114 in the stock being cut. The end portion 112 is connected with the larger diameter shank of pilot 110 by a shoulder 116. A spring pressed, radially projecting ball detent 118 is mounted in the reduced end portion 112 of the pilot and spaced axially from shoulder 116 a distance at least slightly greater than the thickness of the stock in which the hole is to be cut. In FIG. 10 the stock is shown as a piece of sheet metal 120 and the slug cut therefrom is designated 122. Pilot 110 initially projects axially outwardly of the cutter so that the shoulder 116 lies beyond the leading edge of the cutter. To cut a hole the reduced end 112 of pilot 110 is inserted through predrilled hole 114 in the sheet metal panel and the arbor is advanced to bring the cutter into contact with the work. This causes pilot 110 to be retracted to a position wherein shoulder 116 is disposed in a plane slightly axially inwardly of the cutting teeth 58 on the cutter. As the cutter advances into the workpiece the compression spring 70 within shank 32 has sufficient tension therein to displace ball detent 118 and thus permit pilot 110 to engage the workpiece at shoulder 116. When teeth 58 of the cutter penetrate through the sheet metal, slug 122 is retained on the end of pilot 110; and, as the pilot is shifted axially outwardly or forwardly, either under the tension of spring 70 or the actuation of sleeve 60, slug 122 will be displaced outwardly beyond the cutter teeth 58 but will be retained on the end of the pilot. The arrangement shown in FIG. 10 is, thus, admirably suited for use when holes are being cut in conduits or in sections of a vehicle body or frame member where it might be undesirable to permit the cut slug to drop into the closed chamber or section of the member in which the holes are cut. It will be appreciated that any other suitable means may be used on pilot 110 to frictionally retain the cut slug thereon, such as an axially extending leaf spring, a snap ring in a groove, etc. It will also be appreciated from the showing in FIG. 10 that if pilot member 110 is positively driven, such as in the manner illustrated in FIG. 7, the free end of the pilot can be formed as a piercing point, designated 82' and shown in broken lines, or as a drill point. In any event, the spring retention means would be located on the cylindrical, as distinguished from tapered, portion of the pilot member.

In many hole cutting operations where the arbor is mounted on a hand-held power tool it is frequently essential that the pilot be capable of drilling a centering hole. The stock may be too thick to employ a piercing type pilot such as shown in FIG. 7. The operation of predrilling a centering hole and then using a cylindrical guide pilot, such as shown in FIG. 10, is too costly and time consuming for many production operations. However, if the stock is relatively thick a pilot drill on the arbor which penetrates entirely through the workpiece might be undesirable because the chips resulting from drilling the pilot hole may become trapped within the cup-shaped cutter. Accordingly, there is illustrated in FIGS. 11 through 15 two arbors embodying the slug ejecting feature of the present invention which are designed to drill a pilot hole of relatively short depth in the stock being cut while at the same time permitting the annular cutter to cut entirely through the stock.

Figure 12:
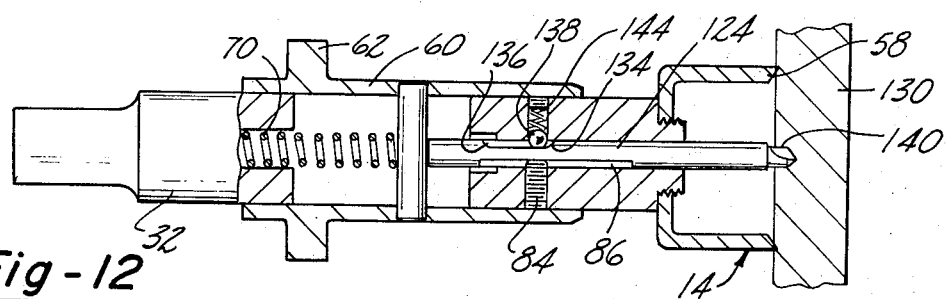
Figure 13:
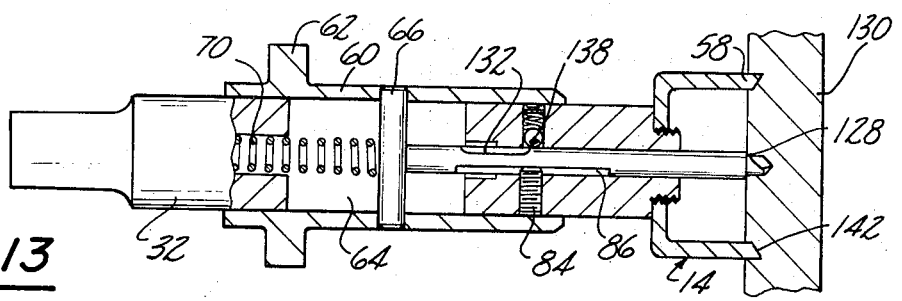
Figure 14:
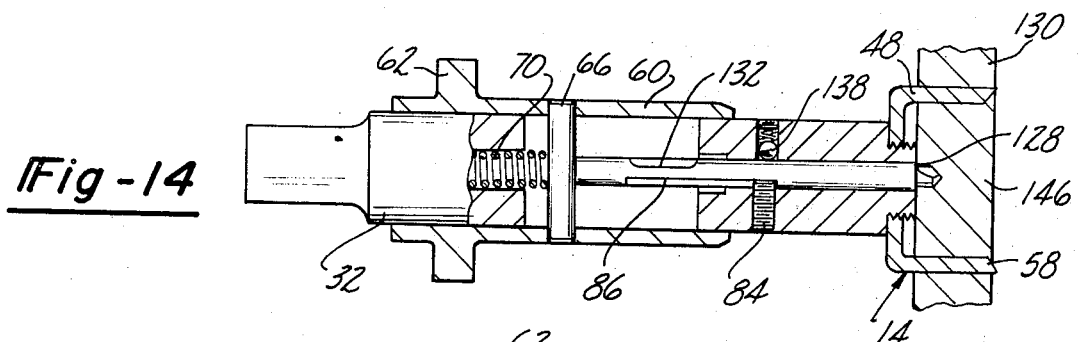

In the embodiment illustrated in FIGS. 11 through 14 the pilot member 124 is positively rotated with shank 32 by locking screw 84 and its extent of axial reciprocation relative to shank 32 is determined by slot 86. At its free end pilot 124 is fashioned as a small diameter drill point 126 of relatively short axial extent connected with the larger diameter shank of the pilot by a shoulder 128. The axial extent of drill point 126 is considerably less than the thickness of the workpiece 130 in which the hole is to be cut. Pilot 124 has a second flat portion 132 ground in one side thereof. The opposite ends of the flattened portion 132 are rounded as at 134,136. A spring pressed ball detent 138 in shank 32 projects radially into the groove formed by the flattened portion 132. Normally compression spring 70 acting against pin 66 projects pilot 124 axially outwardly to the position shown in FIG. 11 wherein ball detent 138 engages the rear rounded shoulder 136 and screw 84 engages the rear shoulder of the flattened portion forming slot 86. In this position drill point 126 projects axially beyond the cutting teeth 58 of cutter 14 a sufficient extent to enable the operator to readily visually locate the drill point at the desired position at the center of the hole to be formed in the workpiece 130. If desired, the center of the hole may be designated by a prick punch. After the cutter is so located on the workpiece the arbor is advanced toward the work. This causes pilot 124 to be retracted against the bias of spring 70. Spring 70 possesses sufficient tension to hold the drill point 126 at the predetermined location, but does not exert sufficient pressure to cause the drill point 126 to cut into the workpiece to any appreciable extent. However, as shown in FIG. 12, when pilot 124 has retracted to a position wherein ball detent 138 engages shoulder 134, the resistance to further retraction of the pilot is substantially increased. In this condition the axial pressure applied to the pilot is of a sufficiently high magnitude to cause the drill point 126 to drill a centering hole 140 in workpiece 130. As shown in FIG. 12, ball detent 138 engages shoulder 134 just after teeth 58 of the cutter engage workpiece 130 and have initiated the cutting of a groove 142 in the workpiece concentric with the center drilled hole 140. After drill point 126 has drilled a hole to the full depth of the short axial extent of drill point 126, shoulder 128 engages the face of the workpiece and imparts very substantial resistance to further drilling action. However, increased axial pressure applied to the arbor causes shoulder 134 to cam detent 138 radially outwardly against the bias of spring 144 so that ball detent 138, as shown in FIG. 13, now engages the outer cylindrical surface of pilot 124 forwardly of shoulder 134 and offers little resistance to further retraction of pilot 124. Thus, a relatively light axial pressure thereafter applied to the arbor causes pilot 124 to retract further relative to shank 32 and the rotary driven teeth 58 of the cutter are fed into the work to cut a progressively deeper annular groove 142 in the workpiece until they penetrate the back side or under side of the workpiece as shown in FIG. 14. In the condition shown in FIG. 14 the circular slug 146 is completely separated from stock 130 and very few chips will have been trapped between the top face of slug 146 and the end wall 48 of cutter 14. This results from the fact that the center hole 140 is drilled to almost its complete depth before the cutter teeth 58 actually engage the workpiece. Thus with the cutter illustrated in FIGS. 11 through 14 the center drilled hole 140 assures positive centering without "skipping" or "skidding" of the cutter over the surface of the workpiece. At the same time very few chips resulting from drilling of hole 140 are trapped within the cutter. Positive ejection of the slug from cutter 14, if it should be wedged therein, is effected in the manner previously described through utilization of sleeve 60.

Figure 15:
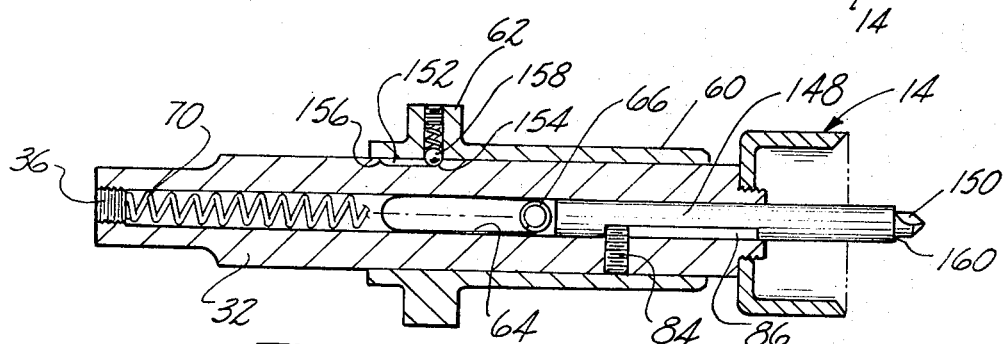
FIG. 15 is a sectional view of an arbor embodying the principle of the arbor shown in FIGS. 11 through 14, but of slightly modified construction.

In the arbor illustrated in FIG. 15 the pilot 148 is formed with a small diameter drill point 150 at the leading end thereof substantially the same as drill point 126 and is locked against rotation relative to shank 32 by locking screw 84. However, shank 32 is fashioned with an axially extending flattened portion 152 on the outer periphery thereof. The flattened portion 152 terminates at its opposite ends in rounded shoulders 154,156. The flattened portion 152 is axially overlapped by sleeve 60 and within flange 62 there is arranged a spring pressed ball detent 158 which normally projects into the groove formed by the flattened portion 152. When pin 66 is located at the forward end of slot 64 in shank 32 ball detent 158 is disposed adjacent the forward shoulder 154.

The operation of the arbor illustrated in FIG. 15 is substantially the same as that illustrated in FIGS. 11 through 14 with the exception that when the drill point 150 initially engages the workpiece sleeve 60 retracts relative to shank 32 against the bias of spring 70 until ball detent 158 engages rear shoulder 156. When this occurs pilot 148 is subjected to sufficient axial pressure to cause drill point 150 to cut a centering hole in the workpiece. Thereafter, when shoulder 160 on the drill point engages the top face of the workpiece, the axial resistance to further drilling is increased substantially and a substantially higher axial force is required to cause ball detent 158 to ride over shoulder 156 and onto the outer cylindrical surface of shank 32. Thereafter pilot 148 retracts relatively freely relative to shank 32 and the axial force applied to the arbor is determined by the rate of feed desired to cause cutter 14 to penetrate through workpiece in the manner described above with respect to FIGS. 11 through 14.

It will be appreciated with respect to the embodiments illustrated in FIGS. 11 through 15 that the axial extent of the grooves formed by the flattened portions 132,152 determine the extent to which the pilot initially retracts freely against the bias of spring 70 without actually producing any substantial cutting by the drill point on the pilot. Obviously these flattened portions 132,152 can be reduced in length to a point where they simply are in the form of a small circular socket in which the ball detents 138,158 are seated. Wehn modified in this manner the drill points initiate drilling of the pilot hole when the pilot members are in the fully extended positions illustrated in FIGS. 11 and 15. The ball detents would then be retracted only upon interengagement of shoulders 128,160 with the top face of the workpiece. As explained previously, this interengagement preferably occurs just after the teeth 58 of the cutter have initiated the cutting of a groove on the workpiece. It will also be appreciated that the effective radial inward pressure exerted by the ball detents can be varied by the inclination of shoulders 134 and 156 or by adjusting the screws utilized to retain the springs against the ball detents. Preferably springs 70 are strong enough to overcome the frictional resistance of the ball detents so that, upon completion of the hole forming operation, spring 70 will automatically project the pilot members outwardly to their fully projected positions shown in FIGS. 11 and 15. Spring 70 should not be unduly stiff, however, as to require the application of excessive axial force to the arbor in order to retract the drill pointed pilot members after the drilled pilot holes are cut to their full depth.

In the embodiments illustrated in FIGS. 11 through 15 it will be appreciated that the shoulders 128,160 on the shank of the drill pointed pilot members provide a means for ejecting the slug cut from the workpiece. However, pilot members 124,148 have an additional advantage as well. When the axis of the arbor is inclined to the face of the workpiece being cut at an angle of other than 90°, the shank portion of the drill point forms a pilot hole in the workpiece which is not perpendicular to the top face of the workpiece, but the axis of the pilot hole is parallel to the side wall of the cutter. Thus the shank of the drill point prevents the center slug from tilting within the cutter and causing it to bind therein.

The arbor arrangements shown in FIGS. 11 through 15 are particularly desirable in connection with forming holes in relatively thick workpieces. This results from the fact that the ball detents are employed to maintain the drill point centered and to apply sufficient axial pressure thereto so that the drill points will cut a centering hole. As a result springs 70 can be relatively light springs. In annular hole cutters employing conventional pilot pins, such as shown in FIG. 1, for example, the springs utilized for projecting the pilot axially outwardly must be relatively stiff to enable the pointed pilot to maintain a centered position on the workpiece. However, if the workpiece is relatively thick then obviously the load on such springs is relatively high when the pilot pin is fully retracted. As a result the propelling force resulting when the slug is cut free and ejected is excessive and capable of propelling the slug at a high velocity through a substantial distance behind the workpiece being cut. In many situations this could present a dangerous condition. With the arbors shown in FIGS. 11 through 15 springs 70 therein can be substantially lighter than the corresponding springs employed in the arbor illustrated in FIGS. 1 through 4.

When the arbors shown in FIGS. 11 through 15 are employed on a machine tool having a uniform feed, springs 70 can be eliminated entirely. This results from the fact that when the arbor is retracted a yoke (such as shown at 28 in FIG. 1) may be employed to return the pilot member to the projected position. In the event such a yoke is not employed, the pilot can be returned to the fully projected position by simply shifting sleeve 60 axially forwardly on shank 32. In this connection, if spring 70 is eliminated, there will be a greater tendency for the cut slug to remain on the end of the pilot member after the slug is cut completely free of the workpiece. Also, if spring 70 is not employed, the spring pressed ball detent preferably engage in a circular socket rather than the elongated flattened portions such as shown at 132 and 154 and as previously described.

I claim:

1. An arbor for an annular hole cutter comprising, a shank having means on the rear end thereof for being secured to a rotary driving member and means on the forward end thereof for supporting a cup-shaped annular cutter having cutting teeth around the leading end of the cup side wall which, when the arbor is rotated and fed axially into a workpiece, are adapted to cut a circular groove through the workpiece and simultaneously form a round slug within the cup side wall, said shank having a central axial bore therein extending to the forward end of the shank, a pilot member axially slideable in said axial bore, means for shifting the pilot member axially forwardly in said bore so that the leading end thereof projects axially outwardly beyond the forward end of the shank, said means including a sleeve extending around and slideable axially on said shank, said shank having an axially extending slot therethrough, said slot terminating at its forward end at a point spaced axially inwardly of the forward end of the shank, a pin fixed in said sleeve and extending through said slot to limit the extent of axial forward movement of the sleeve relative to said shank, said sleeve, when shifted axially forwardly relative to the shank, causes said pin to abut the inner end of the pilot member to shift the same to said axially outwardly projected position, said sleeve having a smooth cylindrical outer surface adapted for sliding engagement within a guide bushing and having adjacent one end thereof a flange extending radially outwardly from said cylindrical surface whereby, when an annular cutter on the forward end of the arbor cuts an opening in a workpiece and produces a circular central slug which binds within the cup, said flange serves as an abutment for driving the sleeve forwardly relative to the shank and thereby causing the pilot member to forcibly eject said slug.

2. An arbor as called for in claim 1 wherein said pin is fixed on said sleeve adjacent the axial mid-point thereof, said sleeve axially overlapping said slot at the opposite ends of its stroke on said shank and said cylindrical outer surface of said sleeve being accurately concentric with the longitudinal axis of said bore.

3. An arbor as called for in claim 1 including an annular cup-shaped cutter mounted on the forward end of the arbor, stop means in said bore adjacent the rear end thereof, a stop rod in said bore adapted, when the pilot member is retracted, to abut against the stop means at its rear end and against the inner end of the pilot member through said pin at its forward end to thereby limit retraction of the pilot member to a position wherein its leading end projects axially outwardly beyond the leading end of the cutter and means connecting the pilot member with the shank for rotation in unison, the leading end of the pilot member being shaped to produce a hole in a metal workpiece when the arbor is rotated and fed axially toward the workpiece, said pilot member having a portion behind said leading end of greater diameter than said leading end, said portion of greater diameter being disposed in a plane axially outwardly of the leading end of the cutter when said pin is disposed at the forward end of said slot.

4. An arbor as called for in claim 3 wherein said stop means adjacent the rear end of said bore are adjustable axially within the bore.

5. An arbor as called for in claim 4 wherein the leading end of the pilot member comprises a drill point and said portion of larger diameter forms a radially enlarged shoulder behind the drill point.

6. An arbor as called for in claim 2 wherein the leading end of the pilot comprises an axially extending cylindrical portion connected with the shank of the pilot member by a radially outwardly extending shoulder, said cylindrical end portion being adapted to be inserted in a predrilled hole in the workpiece so that the cutter will cut a larger hole in the workpiece concentric with the predrilled hole, and means on said cylindrical end portion of the pilot member frictionally engageable with said slug for retaining the slug thereon after the cutter penetrates through the workpiece.

7. An arbor as called for in claim 1 including an annular cup-shaped cutter mounted on the forward end of the arbor and having cutting teeth extending circumferentially around the open end thereof, means forming a rotary driving connection between said shank and pilot member, the leading end of the pilot member being shaped to cut a hole in the workpiece when the shank is rotated with the pilot member in pressure engagement with the workpiece, a spring in said bore biasing said pilot member axially outwardly, means separate from said spring for resisting retraction of the pilot member within said bore beyond a predetermined position where the leading end of the pilot member projects axially beyond the teeth of the cutter so that the pilot member in said position cuts a hole in the workpiece when said shank is rotated while being subjected to axial pressure of at least a predetermined amount, said pilot member being radially enlarged at the portion thereof axially adjacent said leading end for exerting an axially outwardly directed force on the circular slug when the sleeve is driven forwardly on the shank.

* * * * *

PO-1050
(5/69)

UNITED STATES PATENT OFFICE
CERTIFICATE OF CORRECTION

Patent No. 3,825,362  Dated July 23, 1974

Inventor(s) HOUGEN, Everett D.

It is certified that error appears in the above-identified patent and that said Letters Patent are hereby corrected as shown below:

After Column 12, Line 55 Insert the following claims:

-- 8. An arbor as called for in claim 1 including means interconnecting the pilot member and shank for rotation in unison.

9. An arbor as called for in claim 8 wherein the pilot member has a drill point at its leading end.

10. An arbor as called for in claim 9 wherein the pilot member has a radially outwardly extending shoulder adjacent but spaced axially rearwardly of said drill point.

11. An arbor as called for in claim 10 including means for yieldably resisting retraction of said pilot member within said bore until the retraction force on the pilot member reaches a predetermined value in excess of that required to cause the drill point to cut a hole in the workpiece and for thereafter permitting axial retraction of the pilot member by the application of an axial retraction force to the pilot member which is substantially less than said retraction force of predetermined value whereby, as the arbor is rotated and advanced toward a workpiece, the drill point is adapted to cut a progressively deeper hole in the workpiece until said shoulder engages the workpiece, at which time the axial force applied to the arbor can be increased to said predetermined value to overcome the resisting effect of said yieldably means so that further movement of the arbor toward the workpiece by the application of a lesser axial force produces retraction of the pilot member in said bore.

PO-1050
(5/69)

UNITED STATES PATENT OFFICE
CERTIFICATE OF CORRECTION

Patent No. 3,825,362              Dated  July 23, 1974

Inventor(s) HOUGEN, Everett D.

It is certified that error appears in the above-identified patent and that said Letters Patent are hereby corrected as shown below:

Page No. 2

12. An arbor as called for in claim 11 wherein said yieldable resisting means comprises a radially extending shoulder on the pilot member and a resiliently yieldable detent means on said shank engageable with said last-mentioned shoulder and radially retractable to ride past the last-mentioned shoulder upon the application of said retraction force of predetermined value to the pilot member.

13. An arbor as called for in claim 11 wherein said yieldable resisting means comprises a radially extending shoulder on said shank and a resiliently yieldable detent means on the sleeve engageable with said last-mentioned shoulder and radially retractable to ride past said last-mentioned shoulder upon application of said retraction force of predetermined value to the pilot member. --

On the Title page, after the abstract, "7 Claims" should read

-- 13 Claims --.

Signed and sealed this 14th day of January 1975.

(SEAL)
Attest:

McCOY M. GIBSON JR.
Attesting Officer

C. MARSHALL DANN
Commissioner of Patents